US006367339B1

United States Patent
Lilonsky et al.

(10) Patent No.: US 6,367,339 B1
(45) Date of Patent: Apr. 9, 2002

(54) DEVICE FOR SETTING THE DRAG ON A FISHING REEL

(75) Inventors: Michael Lilonsky, Morganville, NJ (US); Michael P. Lydick, Meford, NY (US)

(73) Assignee: Deepsea Sportfishing Specialties, Inc., Morganville, NJ (US)

( * ) Notice: Subject to any disclaimer, the term of this patent is extended or adjusted under 35 U.S.C. 154(b) by 0 days.

(21) Appl. No.: 09/306,064

(22) Filed: May 6, 1999

(51) Int. Cl.[7] .............................. G01L 1/26; G01N 3/08
(52) U.S. Cl. ..................... 73/862.393; 73/828
(58) Field of Search ............................. 73/862.42, 826, 73/828, 831, 862.451, 862.392, 862.393

(56) References Cited

U.S. PATENT DOCUMENTS

| | | | |
|---|---|---|---|
| 3,016,741 A | 1/1962 | Kulp ............................ 73/143 |
| 4,083,233 A | 4/1978 | Seal ............................... 73/95 |
| 4,278,217 A | * 7/1981 | Blackwell .................... 242/217 |
| 4,317,377 A | * 3/1982 | Wrinkle ..................... 73/862.42 |
| 4,422,258 A | 12/1983 | Adams et al. ................. 43/17 |
| 4,693,125 A | 9/1987 | Krutz et al. .................. 73/862 |
| 4,702,431 A | 10/1987 | Kaneko ..................... 242/84.5 |
| 4,840,327 A | 6/1989 | Kaneko ...................... 242/217 |
| 5,088,223 A | 2/1992 | Chu ............................... 43/17 |
| 5,199,206 A | 4/1993 | Richardson ................. 43/18.1 |
| 5,370,329 A | 12/1994 | Kono .......................... 242/246 |
| 5,479,831 A | 1/1996 | Hirose .......................... 73/862 |
| 5,560,560 A | * 10/1996 | Hirose ........................ 242/223 |
| 5,639,038 A | 6/1997 | Hirose ........................ 242/223 |

* cited by examiner

Primary Examiner—Benjamin R. Fuller
Assistant Examiner—Maurice Stevens
(74) Attorney, Agent, or Firm—Davidson, Davidson & Kappel, LLC

(57) ABSTRACT

A drag setting device is provided for setting a desired drag on a fishing line. The drag setting device includes a cable, line, or other fastening member which can be attached to a fishing line of a fishing rod and reel. The drag setting device further includes a pulling member for pulling the fishing line towards the drag setting device, a first actuator for selecting the amount of tension applied by the drag setting device to the fishing line, and a second actuator for causing the drag setting device to apply the selected tension to the fishing line. In use, the drag setting device is mounted to a stationary object such as a work bench or a gunnel of a boat. The end of a fishing line is then attached to the cable, line or other fastening member of the fishing rod and reel. Then, as one person holds the fishing line, the drag setting device pulls against the fishing line until the selected tension is reached. The drag on the fishing line is then set utilizing the conventional mechanisms on the rod and reel. In this manner, the drag setting device in accordance with the present invention more closely simulates the action of a fighting fish by applying an outward tension on the fishing line as the user sets the drag.

23 Claims, 11 Drawing Sheets

DEVICE FOR SETTING THE DRAG ON A FISHING REEL

FIELD OF THE INVENTION

The present invention relates to a device for setting the drag on a fishing line.

BACKGROUND OF THE INVENTION

Devices for setting the drag on a fishing line are known in the art. U.S. Pat. No. 4,317,377 to Wrinkle purports to disclose a drag adjustment device for fishing reels which includes a switch means operatively connected to an indicator light, a means, such as a knob, for selectively shifting the switch means upward or downward, and a spring biased drag element which when pulled by a fishing line pulls the drag element into contact with the switch means to activate the indicator light signaling that the drag is set. Additionally, U.S. Pat. No. 4,083,233 to Seal purports to disclose a drag adjusting device for fishing reels including two arms held together by a hinge, with a plurality of passageways located along each arm for receiving fishing line therin to set the drag to a certain percentage of the maximum test strength of the line.

SUMMARY OF THE INVENTION

Prior art setting devices, however, require the user to pull his or her rod and reel away from the device, which is the opposite from what happens when a fish is on the line of the fishing rod and reel. A fish pulls outwardly against the rod and reel exerting a force on the line, whereas in prior art devices, the user pulls against a drag setting device attached to the line. Therefore, the prior art lacks a way of giving the user a drag setting under the same conditions as having a fighting fish on the line. This may result in fishing line breakage.

In accordance with the present invention, a drag setting device is provided which includes a cable, line, or ether fastening member which can be attached to a fishing line of a fishing rod and reel. The drag setting device further includes a pulling member for pulling the fishing line towards the drag setting device, a first actuator for selecting the amount of tension applied by the drag setting device to the fishing line, and a second actuator for causing the drag setting device to apply the selected tension to the fishing line. In use, the drag setting device is mounted to a stationary object such as a work bench or a gunnel of a boat. The end of a fishing line is then attached to the cable, line or other fastening member of the fishing rod and reel. Then, as one person holds the fishing line, the drag setting device pulls against the fishing line until the selected tension is reached. The drag on the fishing line is then set utilizing the conventional mechanisms on the rod and reel. In this manner, the drag setting device in accordance with the present invention more closely simulates the action of a fighting fish by applying an outward tension on the fishing line as the user sets the drag.

In accordance with a first embodiment of the present invention, a drag setting device is provided which includes a cable that attaches to a line of a fishing rod to set a desired drag on the line by simulating the pulling action of a fish. The drag setting device includes a housing having a first side wall and a second side wall that is opposite the first side wall. Within the housing is disposed a spool that has a front end and a rear end, the rear end located adjacent to the second side wall. A transmission element is mounted on a shaft that extends through the second side wall. The transmission element extends coaxially within the spool, and has a front end which is engagable with the front end of the spool. A rotator, such as a hand crank, is disposed outside of the housing and is connected to the shaft for turning the shaft to rotate the transmission element about the shaft.

A drag setting assembly is also provided for urging the front end of the spool into engagement with the front end of the transmission element. The drag setting assembly includes a tension adjuster for varying the amount of force exerted upon the front end of the spool by the drag setting assembly. As a user actuates the rotator, the transmission element causes the spool to rotate, thereby pulling the fishing line towards the drag setting device, and wrapping the fishing line around the spool as the spool rotates. When the force exerted by the line on the spool exceeds the frictional force between the front end of the spool and the front end of the transmission element, the transmission element will slip. By adjusting the tension adjuster of the drag setting assembly, the frictional force between the front end of the spool and the front end of the transmission element is adjusted. Therefore, each position of the tension adjuster corresponds to a given force exerted on the line by the drag setting device after the rotator has been rotated until the transmission element slips.

Preferably, a plurality of spaced clutch balls are disposed on the front end of the spool, and a plurality of transmission teeth are disposed on the front end of the transmission element. Each transmission tooth extends between two adjacent clutch balls to form an engagement between the transmission element and the spool. As the transmission element rotates under the control of the rotator, the spool is caused to rotate and exert an inward force on the fishing line. The drag setting assembly is in contacting relation with the clutch balls, and is operable to move the clutch balls towards the transmission element and into further engagement with the transmission teeth, and to move the clutch balls away from the transmission element and into lesser engagement with the transmission teeth. The closer the clutch balls move towards the transmission element, the greater the force the spool can apply to the fishing line before the transmission element slips. In this manner, each position of the tension adjuster corresponds to a given force exerted on the line by the drag setting device after the rotator has been rotated until the transmission element slips.

In accordance with further aspects of this embodiment, the shaft is supported within a bearing mounted in the second side wall. In addition, a spool bearing is mounted in the housing between the second side wall and a rear end of the spool for supporting the rotation of the spool. The spool rotates with the transmission element when the plurality of clutch balls are engaged with the plurality of transmission element teeth.

The drag setting assembly is located within the housing of the device between the first side wall and the plurality of clutch balls. Preferably, the drag setting assembly includes a pressure spring and a pressure spring plate in contacting relation with the pressure spring adjacent to the first side wall. Also, preferably included within the drag assembly would be a slip clutch plate in contacting relation with the pressure spring adjacent to the plurality of slip clutch balls.

The tension adjuster preferably has a front element and a rear element for varying the amount of tension exerted upon the drag assembly. The front element of the tension adjuster is moveable axially through the first side wall in response to manipulation of the rear element. Preferably, the rear element of the tension adjuster is either an ergonomic hand knob or a lever. The front element is in contacting relation with the pressure spring plate. As the front element of the tension adjuster moves axially inward (towards the second side wall), the front element, via the pressure spring plate, pressure spring, and slip clutch plate forces the slip clutch balls into further engagement with the transmission element teeth.

The device of the present invention may be mounted in a gunnel of a boat upon a gunnel mount assembly which includes an upper adjustable member, preferably an upper telescopic rod and a lower adjustable member, preferably a lower telescopic rod. The upper adjustable member and the lower adjustable member are each axially adjustable to different lengths depending upon a user's preference. The device is mounted upon the upper adjustable member, and the lower adjustable member is housed within the gunnel of the boat. Also included with the gunnel mount assembly is a pivotor, preferably a hinge, for connecting the upper adjustable member with the lower adjustable member. The pivotor is adjustable for selecting a desired angle for the gunnel mount assembly. Further, a locking mechanism, preferably a knob, is also included in the gunnel mount assembly for clamping the pivotor closed to secure the desired angle.

Alternatively, the device of the present invention may be mounted on a workbench by a workbench assembly including a bench clamp apparatus and a sleeve. The sleeve is preferably about ¼ the size of an actual gunnel and is clamped to the workbench by the bench clamp apparatus. The workbench assembly further includes the gunnel mount assembly as described above, in which the device is mounted on the upper adjustable member and the lower adjustable member is housed within the sleeve.

While the clutch ball and transmission teeth configuration described above is preferable, alternative mechanisms for imparting a predetermined inward force of a fishing line are also possible.

BRIEF DESCRIPTION OF THE DRAWINGS

FIG. 1-A is a perspective view of the device of FIG. 1;

DETAILED DESCRIPTION OF THE PREFERRED EMBODIMENTS

Figure 1:
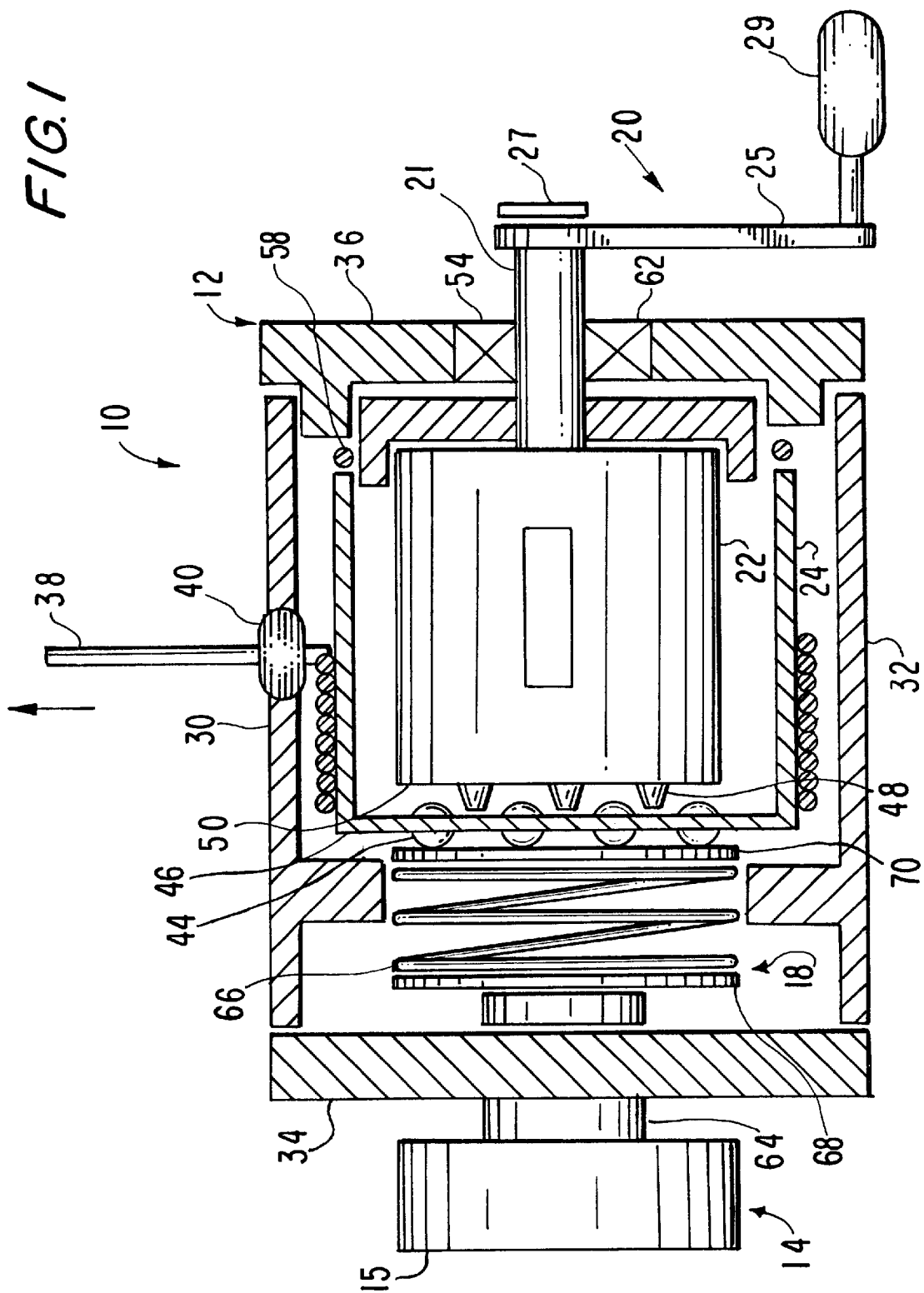
FIG. 1 shows a cross sectional view of the device of a first embodiment of the drag setting device.
Figure 1A:
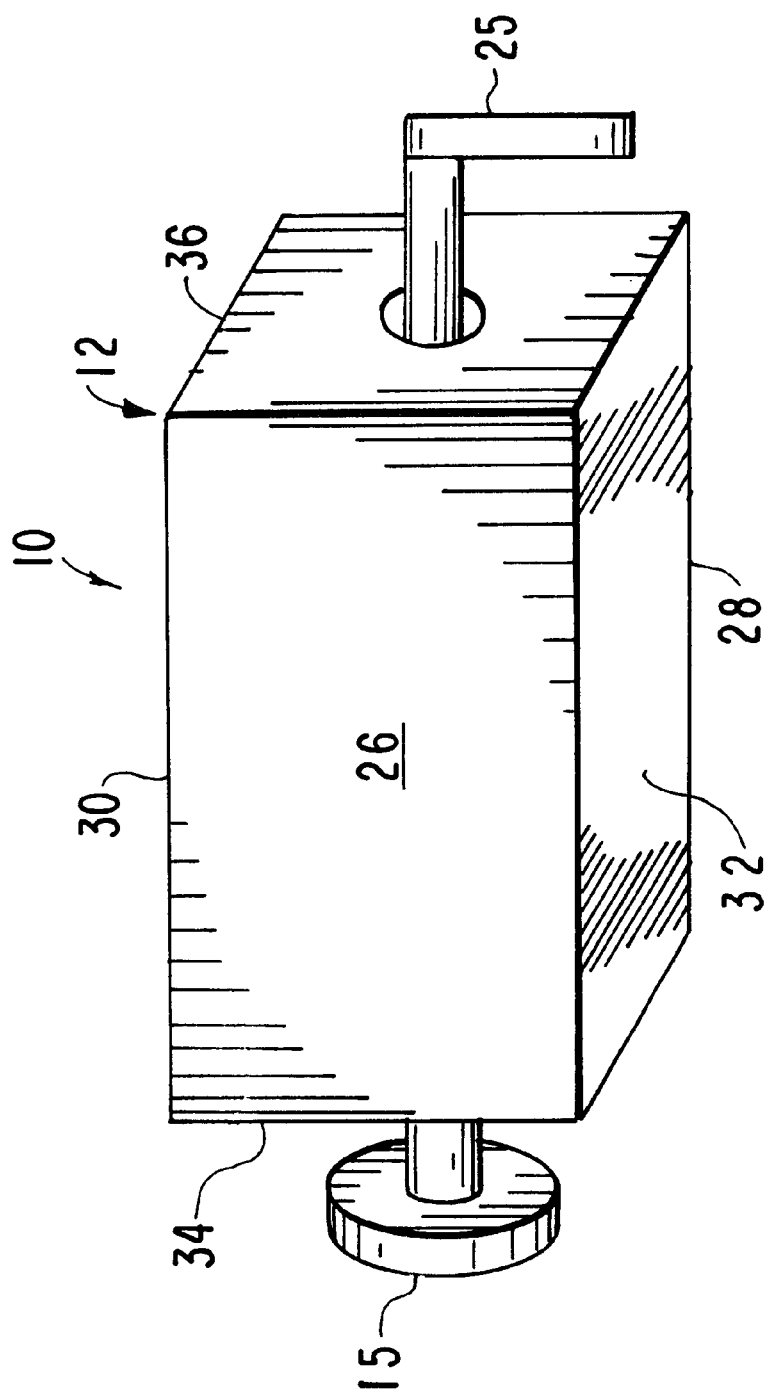
Figure 2:
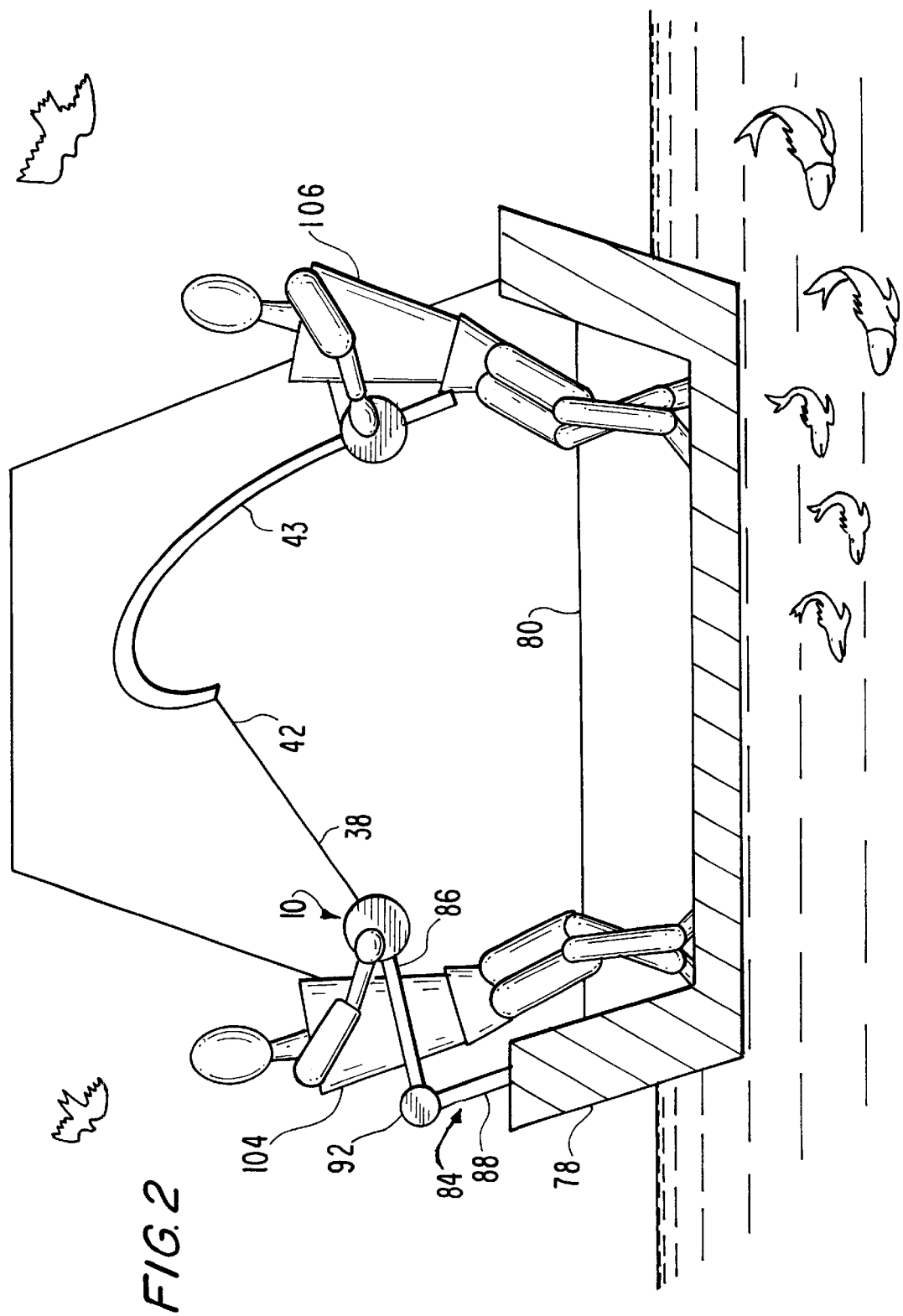
FIG. 2 is a rear cut-away view of a transom of a boat, with a gunnel mount assembly mounting the device of FIG. 1 to the boat.

Referring to an embodiment of the present invention shown in FIG. 1, a drag setting device is referred to generally at 10. The device 10 includes a housing 12, a tension adjuster assembly, such as a pressure knob assembly 14, a drag setting assembly referred to generally at 18, a rotator or hand crank 20, a shaft member or shaft 21, a transmission element 22, and a spool 24. As shown in FIG. 1-A, the housing 12 comprises a front wall 26, a rear wall 28, a top wall 30, a bottom wall 32, a first side wall 34 and a second side wall 36. Referring back to FIG. 1, a cable 38, preferably steel braided cable, is wound around the outer surface of the spool 24, and extends outside of the housing 12 guided through a guiding member or cable ferrel 40 located in the top wall 30 of the housing 12. As shown in FIG. 2, the cable 38 is connected to a fisherman's line 42 of a fishing rod 43. The cable 38 may be connected to the fisherman's line 42 in any suitable manner. For example the fisherman's line 42 can be tied to the cable 38 or clipped to the cable 38 with a conventional fishing snap swivel.

Referring back to FIG. 1, the spool 24 further comprises a plurality of clutch balls 44, preferably spaced located along an outer periphery of front end 46 of the spool 24, which are engagable by a plurality of transmission teeth 48, preferably spaced on outer periphery of a front end 50 of the transmission element 22. The transmission element 22 is housed within the spool 24 and is mounted onto shaft 21. The shaft 21 is connected to the hand crank 20 at an arm 25 of the hand crank 20, preferably via a pivot pin 27. The shaft 21 is rotatingly supported in bearing 54 of side wall 36. Transmission element 22 is thereby rotatable about the shaft 21 by the turning of a crank handle 29 attached to the arm 25 of the hand crank 20. The clutch balls 44 are disposed along the outer periphery of front end 46 of the spool 24 in such a manner that they are free to move axially (e.g. in the direction of the right housing 36 or left housing 34), but not radially.

Spool 24 is rotatably supported through spool bearing 58 which is mounted in the interior of the housing 12 between the second side wall 36 and the rear end 62 of the spool 24. Therefore, as the hand crank 20 turns, causing a rotation of the transmission element 22, the teeth 48 will engage the slip clutch balls 44, causing a corresponding rotation of the spool 24.

In the embodiment of the present invention shown in FIG. 1, the pressure knob assembly 14 comprises a rear element or pressure knob 15, and a front element or piston member 64 which is integral with, or mounted to, the pressure knob 15 and is axially movable forwards or backwards through first side wall 34 depending on the direction in which the pressure knob is turned. The adjustment of the pressure knob 15 to a selected tension causes the piston member 64 to urge against the drag setting assembly 18 which in turn, urges against the plurality of slip clutch balls 44 with a certain force, moving the clutch balls 44 into a predetermined position with respect to the transmission teeth 48.

Drag setting assembly 18 preferably comprises a pressure spring 66, as shown in FIG. 1, with two plates, a spring pressure plate 68 and a slip clutch plate 70 on opposing sides of the pressure spring 66 with both plates in contacting relation with the pressure spring 66. Spring plate 68 is located adjacent to the piston member 64 and is axially moveable in the direction in which the piston member 64 moves. The pressure spring 66 compresses or decompresses depending upon the direction of movement of the pressure spring plate 68. Finally, the slip clutch plate 70 is also moveable in an axial direction, either forwards applying a greater force to the slip clutch balls 44 or backwards providing a lesser force to the slip clutch balls 44, depending on direction of movement of the pressure spring 66.

Figure 8:
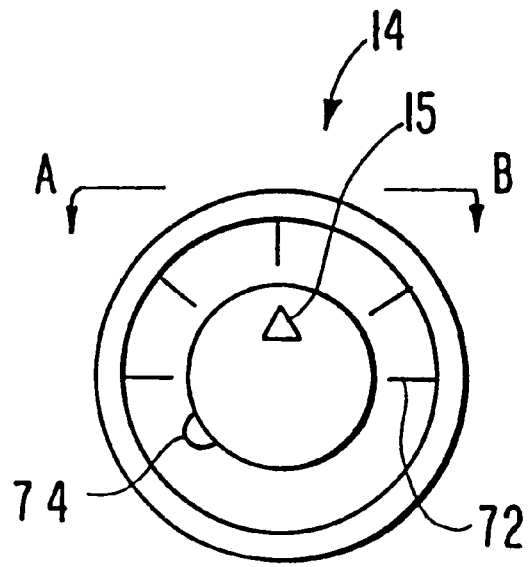
FIG. 8 is a pressure knob in accordance with one of the embodiments of the invention.

The pressure knob 15 is preferably a factory calibrated ergonomic hand knob, as shown in FIG. 8, with various tension settings 72 along the perimeter of the knob's range of motion that employs a ball detent mechanism 74 in which the pressure knob 15 will either stop or click at some predetermined point. In addition, the ball-detent 74 will also allow the user to quickly and audibly determine the tension settings based on a 5 or 10 pound incremental increase/decrease each time the knob is turned and clicks into a new position. In addition, the pressure knob 15 will allow the user to change the breakaway tension between a known range of 2 to 60 pounds of force in either directions of arrow A or B.

Figure 9:
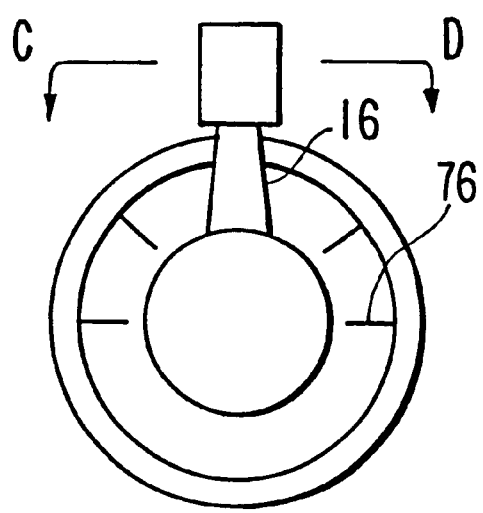
FIG. 9 is a lever in accordance with one of the embodiments of the invention.

Alternatively, instead of a pressure knob, a pressure lever 16, as shown in FIG. 9, may be used. The lever of the device would work in similar fashion to the hand knob, with the exception that the lever would follow an arc of motion approximately plus or minus 45–60 degrees from it's neutral center position, in either the direction of arrows. C or D. The lever 16 of the device 10 would similarly have predetermined indents 76 that would make an audible click that alerts the user to a known change in the drag, perhaps 2 to 5 pounds of tension. In addition, as with the pressure knob 15, the pressure lever 16 would allow the user to change the breakaway tension between a known range of 2 to 60 pounds of force. Moreover, as mentioned with the pressure knob 15, it is also preferable that the pressure lever 16 also be factory calibrated.

In this regard, the device 10 is calibrated so that, for example, when the position of the pressure lever 16 or pressure knob 15 corresponds to 20 pounds of tension on the line, the slip clutch balls will be urged by the drag setting assembly 18 into a position relative to the transmission teeth 48 which will cause the teeth 48 to slip once the tension on the fishing line exceeds 20 pounds.

In accordance with further aspects of the present invention, the device 10 could be equipped with digital readout by measuring the resistance of a current as the pressure knob 15, pressure lever 16, or any equivalent in the art, is manipulated and converting that resistance to pounds of drag.

Figure 4:
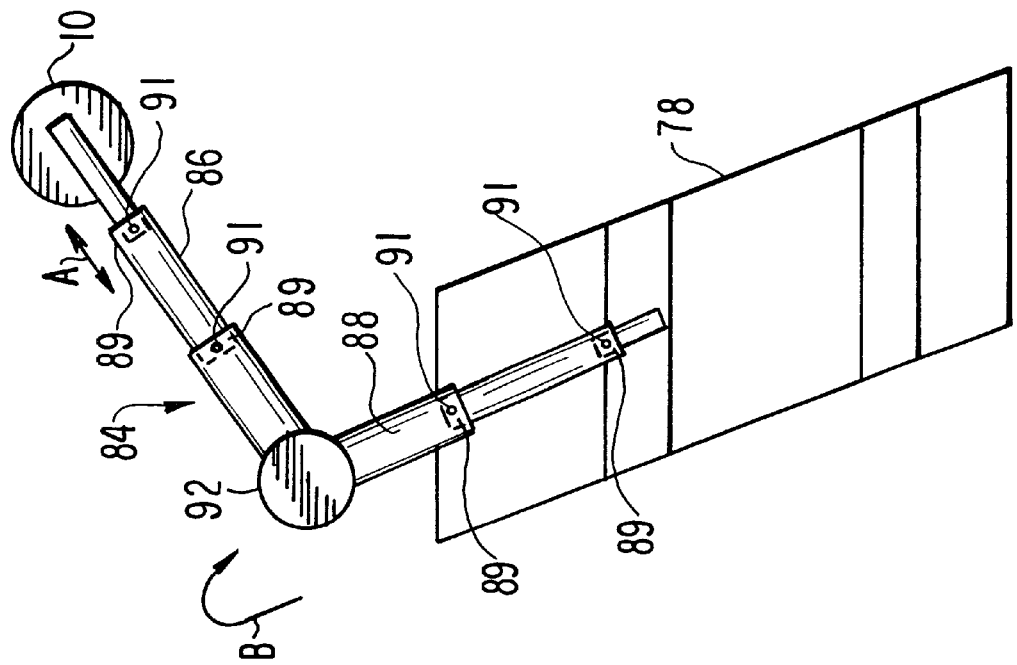
FIG. 4 is a cross sectional view of the a transom of a boat, with a gunnel mount assembly mounting the device of FIG. 1 to the boat.
Figure 5:
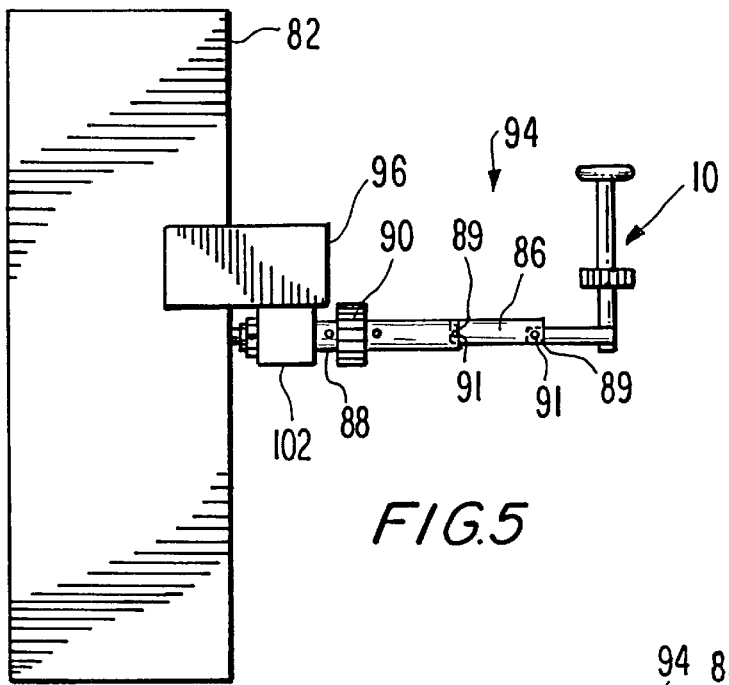
FIG. 5 is a top view of the device of FIG. 1 mounted on a workbench.
Figure 6:
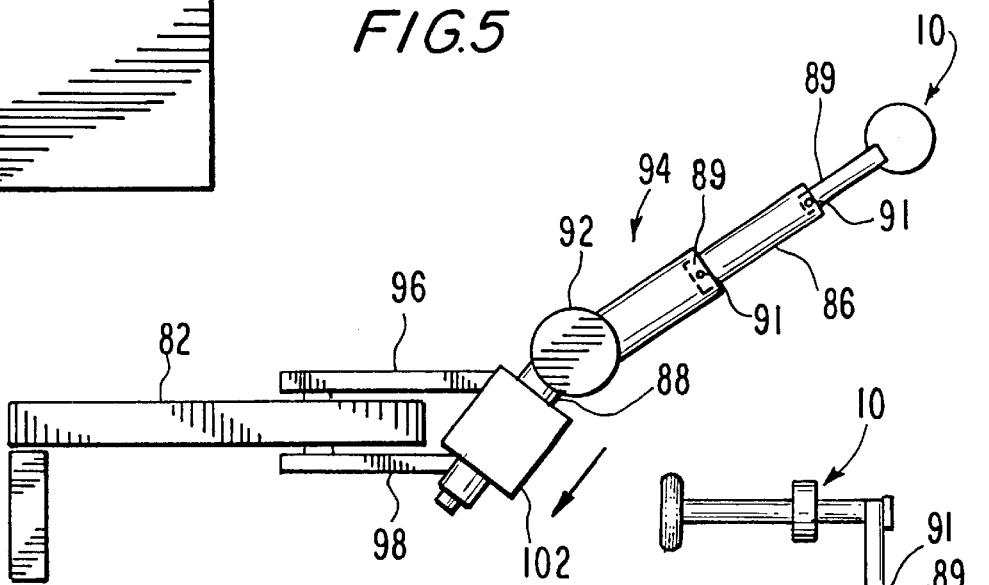
FIG. 6 is a side view of the device of FIG. 1 mounted on a workbench.

As shown in FIGS. 2 and 4, the device 10 may be mounted for use by placing the device 10 in a gunnel 78 of a boat 80, or, as shown in FIGS. 5 and 6, on a workbench 82. Other mounting procedures known in the art may also be employed with the present invention.

Figure 3:
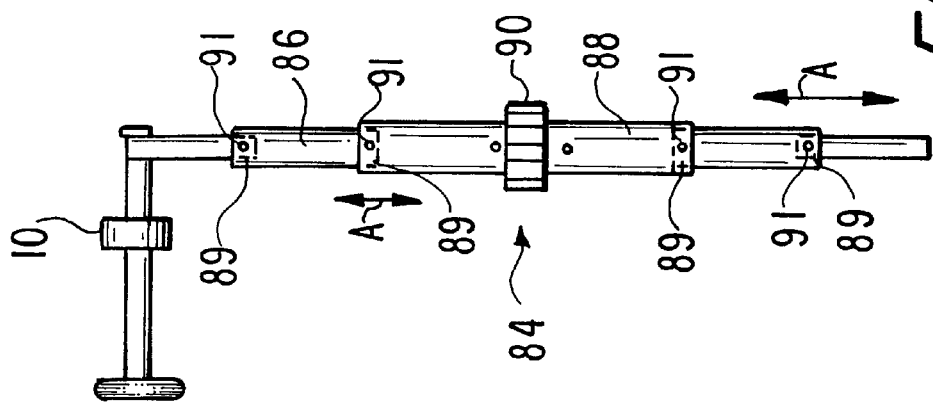
FIG. 3 is a panoramic view of the telescopic support structure of the gunnel mount of FIG. 2.

Specifically, when mounting the device 10 on the boat 80, a gunnel mount assembly 84, as illustrated in FIGS. 2, 3, and 4, is preferably used to support the device 10 in the gunnel 78 of the boat 80. Referring to FIG. 3, the gunnel mount assembly 84 includes an upper adjustable member or upper telescopic rod 86, and a lower adjustable member or lower telescopic rod 88 connected to each other by a pivoting member, such as a hinge 90. In addition, the gunnel mount assembly 84 further includes a locking mechanism or knob 92, as shown in FIG. 4, to clamp the hinge 90 closed and secure a desired angle for the gunnel mount assembly 84. This gunnel mount assembly 84 allows the user to easily axially adjust the height of the two telescopic rods 86, 88 as shown by arrow A in FIGS. 3 and 4 through the use of multiple spring loaded snaps 89 that lock into place when the snap 89 is slid underneath a hole 91 in telescopic rods 86, and 88. The gunnel mount assembly 84 also allows the user to adjust the angle of the two telescopic rods 86, 88 via knob 92 as shown by arrow B in FIG. 4, according to the individual preferences of the operator of the device 10.

In order to mount the device 10 to the workbench 82, a work bench assembly 94, as shown in FIGS. 5 and 6, may be employed. The workbench assembly 94 includes a bench clamp apparatus, a sleeve 102, and the gunnel mount assembly 84 as described above.

Figure 7:
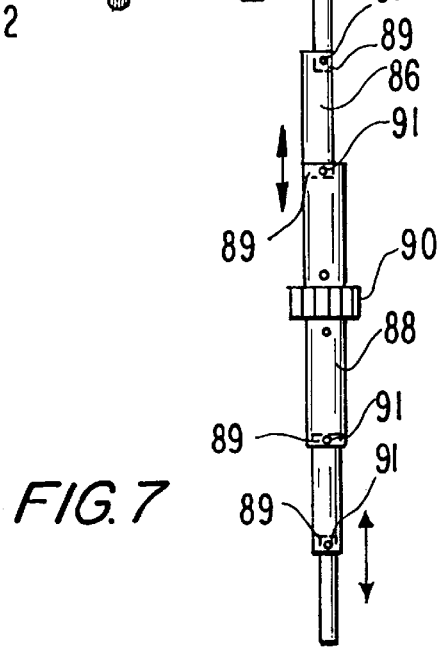
FIG. 7 is a panoramic view of a telescopic support structure of the gunnel mount assembly for mounting the device on a workbench.

The bench clamp apparatus includes an upper plate 96 and a lower plate 98 attached to the workbench 82, preferably by the use of screws or a quarter turn cam mechanism. Attached to the bench clamp apparatus would be the sleeve 102, which is preferably about ¼ the length of an actual gunnel. The device 10 would be mounted on the gunnel mount assembly 84, which in turn, is disposed within the sleeve 102, in similar fashion as described above for mounting the device 10 in the gunnel 78 of the boat 80. In this regard, the bottom telescopic rod 88, shown in FIGS. 5, 6, and 7 may be configured in a collapsed position (as shown in FIG. 6) so as to minimize portion of the bottom telescopic rod 88 which protrudes beyond the sleeve 102.

In using the embodiment of the device 10 illustrated in FIG. 1, it is preferable to have two people involved in setting a desired drag on a fisherman's line 42. Specifically, a first person 104 would first mount the device 10 as described above by either placing the device 10 in the gunnel 78 of the boat 80 or placing the device 10 directly in the sleeve 102 which, in turn, is mounted to the workbench 82. Next, the first person 104 would connect the cable 38 from the device 10 to the fisherman's line 42 as described above. Then, a second person 106 would hold the fishing rod 43 in which the drag was to be set, while the first person 104 turned the pressure knob 14 to the desired tension for the fisherman's line 42. If an increased tension is desired for the fisherman's line 42, then the first person 104 would turn the pressure knob 14 clockwise to cause the piston member 64 to urge against the spring plate 68 to compress the pressure spring 66. In turn, the pressure spring 66 would press against the slip clutch plate 70 causing the slip clutch plate 70 to move the slip clutch balls 44 of the spool 24 into further engagement with the transmission teeth 48. However, if less tension is desired for the fisherman's line 42, the pressure knob 14 would instead be turned in a counterclockwise direction, decompressing the pressure spring 66. This, in turn, will decrease the force applied by the slip clutch plate 70 against the slip clutch balls 44, allowing the slip clutch balls 44 to move towards the first wall 34, and into lesser engagement with the transmission teeth 48.

Finally, the first person 104 would turn the hand crank 20 of the device 10 thereby rotating transmission element 22 and causing the transmission teeth 48 to transfer a radial force against the slip clutch balls 44, which in turn would cause the spool 24 to turn taking up the fisherman's line 42. As rotation of the hand crank 20 continues, a point is reached when the tension on the fisherman's line 42 and cable 38 become equal to the tension set on the pressure knob 15. At that point, the force applied to the spool by the fisherman's line 42 and cable 38 exceeds the frictional force between the slip clutch balls 44 and the transmission teeth 48, causing the slip clutch balls 44 to slip out of engagement with the transmission teeth 48 so that the transmission element 22 rotates freely without causing a corresponding rotation of the spool 24. This disengagement of the slip clutch balls 44 from the transmission element teeth 48, serves as an indicator that the proper drag has been set. At that point, the second person 106 slowly releases their drag until the fisherman's line 42 begins to drag outwards, knowing the tension in the fisherman's line 42 to be equal to the tension set on the pressure knob 15.

Figure 10:
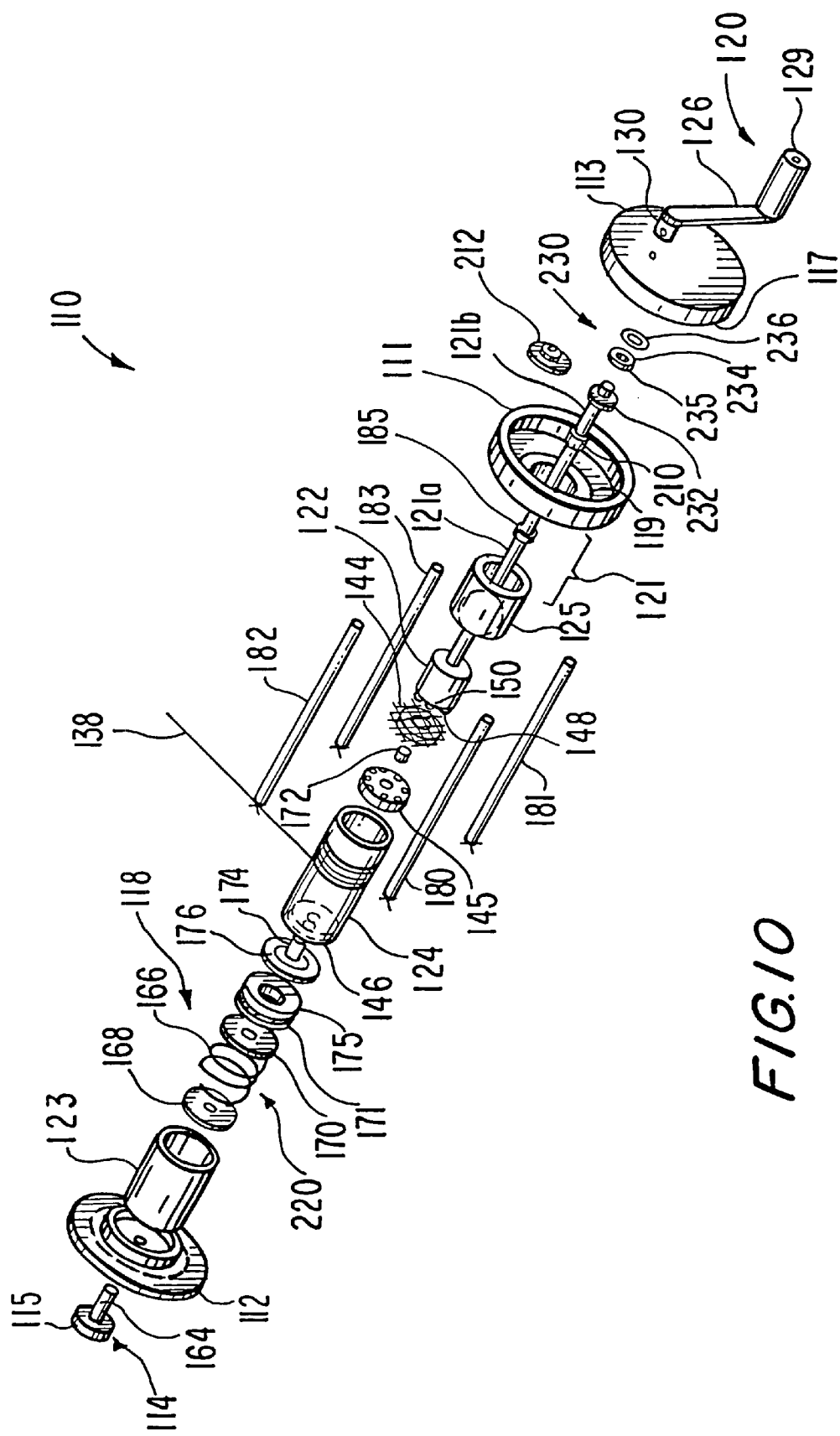
FIG. 10 is an exploded perspective view of a second embodiment of the drag setting device in accordance with the present invention.

FIG. 10 shows a second embodiment of the drag setting device of the present invention in which the drag setting device 110 includes a right housing 111 and a left housing 112, a right housing cover 113, a tension adjuster assembly, such as a pressure knob assembly 114 a drag setting assembly referred to generally at 118, a rotator or hand crank 120, a shaft 121, a transmission element 122, a protective tube or oil shield 123, a spool 124, and a support sleeve 125. The right housing 111 is connected to the left housing 112 by four connecting posts 180, 181, 182, and 183. Spool 124 is located within the device 110 between the right housing 111 and the left housing 112. A cable, preferably steel braided cable 138, is wound around the outer surface of the spool 124 and extends outside of the device 110 for attachment to a fisherman's line 42 in the same manner as described above in the first embodiment and shown in FIG. 2.

The spool 124 further comprises a plurality of clutch balls 144, preferably spaced within a clutch ball capture disc 145 which is disposed flush with the front end 146 of the spool 124. The clutch balls 144 are mounted within the clutch ball capture disc 145 in such a manner that they are free to move axially (e.g. in the direction of the right housing 111 or left housing 112), but not radially. In order to provide a slip fit for the clutch balls 144 mounted within the clutch ball capture disc 145, only enough space is permitted for the clutch balls to be dropped in freely during assembly. In addition, the clutch balls 144 are engagable by a plurality of transmission teeth 148 located on outer periphery of a front end 150 of the transmission element 122.

The transmission element 122 is housed within the spool 124 and is mounted on shaft element 121a of shaft 121. The shaft 121, includes shaft element 121a and shaft element 121b connected together by a needle bearing clutch 185 integral with the shaft 121. In turn, shaft element 121b extends through the right housing 111 and into the right housing cover 113 where it is attached to inner side wall 117 of the right housing cover 113. Transmission element 122 is rotatable about shaft element 121a by the turning of crank handle 129 of hand crank 120 clockwise to activate a gear mechanism 200.

Specifically, the gear mechanism 200, located between right housing 111 and right housing cover 113, includes a pinon gear 210 mounted on shaft element 121b and a drive gear 212 mounted on handle shaft 130 and operatively connected to pinon gear 210. The handle shaft 130 extends through right housing cover 113 to the exterior of the device 110 where it is connected to crank arm 126 of hand crank 120.

When crank handle 129 is rotated, the drive gear 212 will turn about handle shaft 130 causing the rotation of pinon gear 210 about shaft element 12b. In turn, the rotation of the pinon gear 210 causes both shaft element 121b and shaft element 121a to rotate simultaneously if the crank handle 129 is rotated in the clockwise direction.

If crank handle is instead rotated counterclockwise, only shaft element 121b will rotate. Shaft element 121a will be prevented from rotating by needle bearing clutch 185 which will only allow rotation of shaft element 121a in a clockwise direction. This prevents backlash of the crank handle 129 which could potentially cause an injury to the hand of the person operating the device 110 and/or to a person holding the fishing rod 43, depicted in FIG. 2, in which the drag is to be set.

As the crank handle 129 is turned in the clockwise direction, causing a rotation of the transmission element 122, the transmission teeth 148 will engage the clutch balls 144, causing a corresponding rotation of the spool 124. As the user turns the crank handle 129, causing rotation of both the transmission element 122 and spool 124 simultaneously, eventually a point is reached when the force exerted by the fisherman's line 42 on the spool 124 exceeds the force exerted on the plurality of clutch balls 144 by the transmission teeth 148. At this point, the clutch balls 144 will slip out from engagement with the transmission teeth 148 of transmission element 122 allowing the transmission element 122 to rotate freely.

Also provided is a support sleeve 125 mounted on shaft element 121a and attached to an inner wall 119 of the right housing 111. The support sleeve 125 maintains the transmission element 122 in contacting relation with the clutch ball capture disc 145. The sleeve 125 also protects the moving parts of the device 110 from the operator and also functions as a grease enclosure for maintaining lubrication of the device 110. In addition, a right bushing 172 is also provided which is fully contained within the clutch ball capture disc 145 for maintaining the clutch ball capture disc 145 and transmission element 122 in axial alignment with one another.

Pressure knob assembly 114 comprises a rear element or pressure knob 115, and a front element or pressure adjustment stud 164 which is integral with the pressure knob 114 and axially movable forwards or backwards through the left housing depending on the direction in which the pressure knob 115 is adjusted. The adjustment of the pressure knob 115 in the clockwise direction to a selected tension causes the pressure adjustment stud 164 to urge against the drag setting assembly 118 which in turn, urges against the plurality of clutch balls 144 with a certain force, moving the clutch balls into a predetermined position with respect to the transmission teeth 148. Adjustment of the pressure knob in the counterclockwise direction causes the drag setting assembly 118 to move in the opposite direction away from the clutch balls 144 thereby lessening the amount of holding tension against the spool 124 and slowly releasing the cable 136 outward from the device 110.

The drag setting assembly 118 is preferably housed within oil shield 123 which is located partially within the left housing 112 and adjacent to clutch balls 144 contained within clutch ball capture disc 145.

Drag setting assembly 118 preferably includes a pressure spring 166, a pressure spring plate 168, and pressure washers 170. The pressure spring plate 168 is located on one side of the pressure spring 166 and adjacent to the pressure adjustment stud 164. On the opposite side of the pressure spring 166 is pressure washer 170. The pressure spring plate 168 and pressure washer 170 are both in contacting relation to the pressure spring 166.

Also preferably provided is an adjustment assembly 220 which includes a left side washer 171 adjacent to pressure washer 170, a right side washer 176 adjacent the front end 146 of the spool 124, and a needle roller thrust bearing 175 in between left side washer 171 and right side washer 176, all in contacting relation with one another. The right and left side washers 171, 176 provide a constant even bearing surface for needle roller thrust bearing 175, and the needle roller thrust bearing 175 provides a near zero friction plane between the front end 146 of the spool 124 and pressure washer 170 of the device 110, allowing for more accurate calibration and eventual setting of cable tension. A left bushing 174 is also preferably disposed within the clutch ball capture disc 145 to center front end 146 of the spool 124 relative to the shaft. Adjustment stud 164 is coupled to pressure spring pate 168 such that an axial movement of the stud 164 causes a corresponding compression/decompression of the spring 166 and a resulting movement of assembly 220 to increase/decrease the force applied to the clutch balls 144.

Also provided is a right side friction reduction assembly 230 which includes a pressure cap 232, a right thrust bearing 234, and a friction washers 235, 236. The pressure cap 230 is fitted on shaft element 121b near the end of shaft element 121b adjacent inner wall 119 of the right housing cover 113. Pressure cap 232 provides a bearing surface to be applied to right thrust bearing 234. Right thrust bearing 234 provides near zero friction levels between the right housing cover 113 and pressure cap 230. Lastly, friction washers 235, 236 provide an even bearing surface between the right housing cover 113 and the pressure cap 232.

The device 110 of the second embodiment may be mounted to either a gunnel of boat or a workbench in the same manner as set forth above for the first embodiment and illustrated in FIGS. 2, 3, 4, 5 and 6. In addition, pressure knob 115 of the second embodiment is preferably the same type of factory calibrated pressure knob or lever for setting the desired drag as described for the first embodiment and illustrated in FIGS. 8 and 9. A digital readout may also be provided as described above. Lastly, the device 110 of second embodiment operates in generally the same manner as set forth above for the first embodiment.

Figure 11:
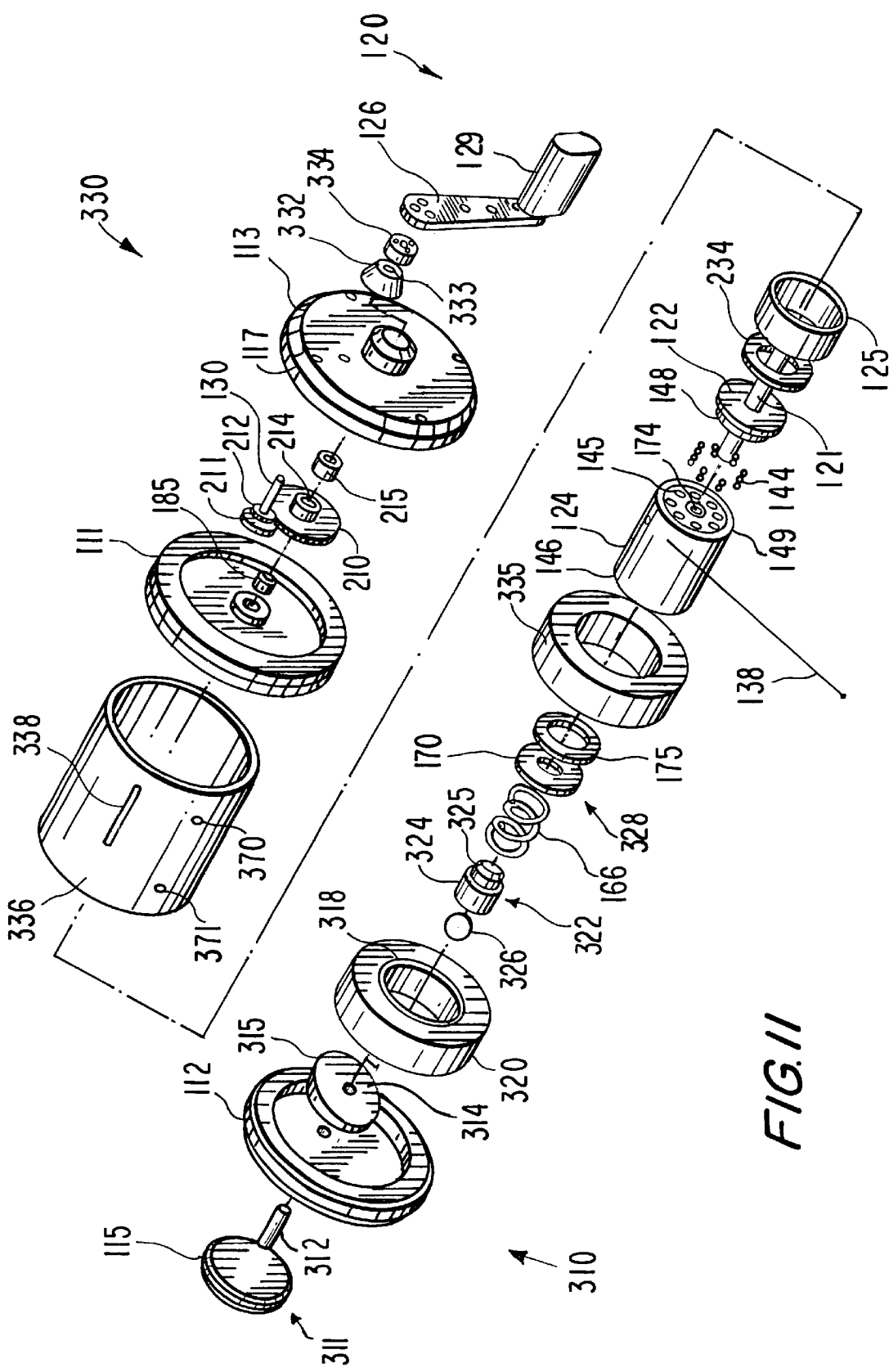
FIG. 11 is an exploded perspective view of a third embodiment of the drag setting device in accordance with the present invention.
Figure 12:
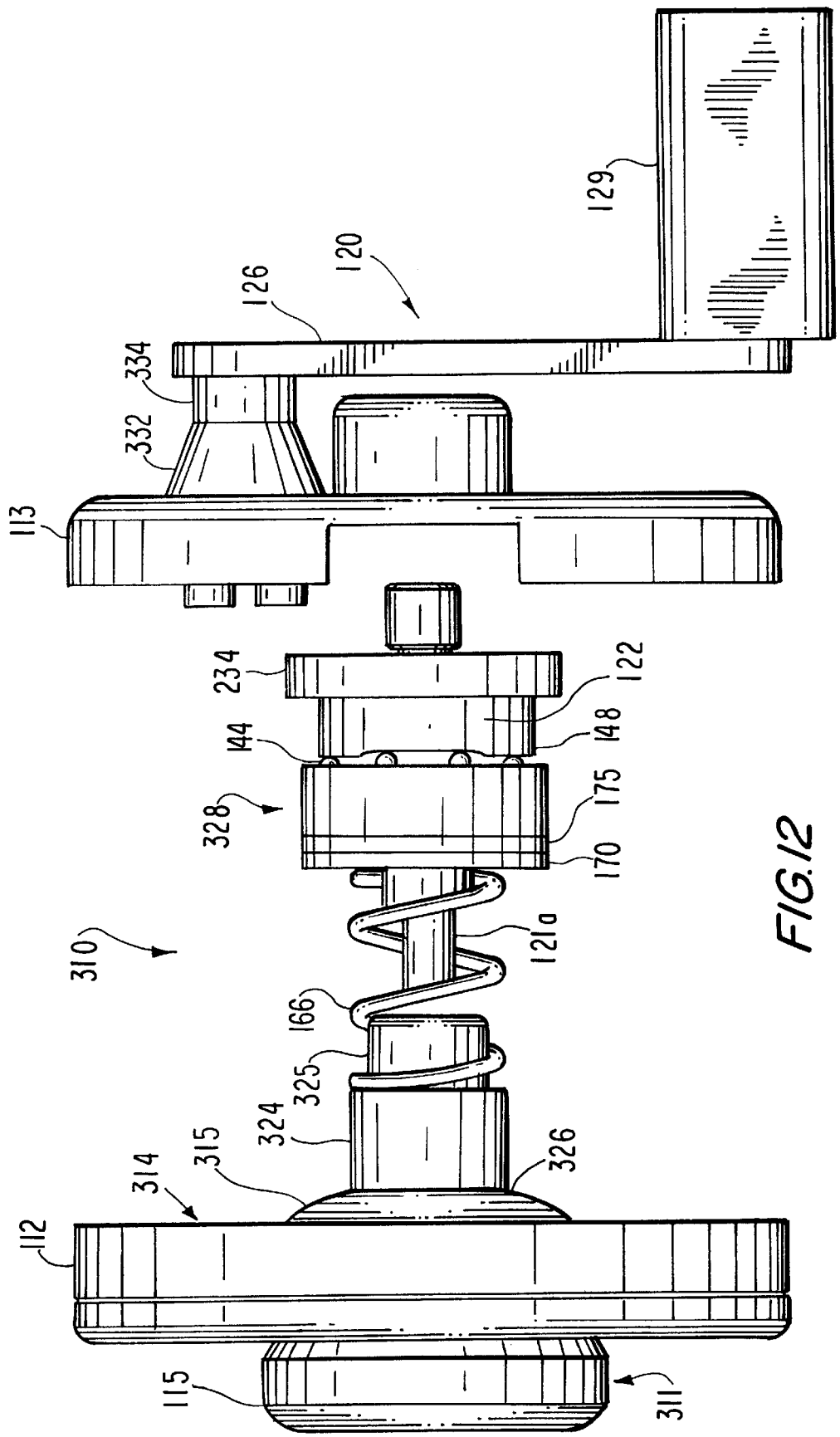
FIG. 12 is an internal view of the drag setting device in accordance with the present invention.

FIGS. 11 and 12 show a third embodiment of the device for setting the drag on a fishing reel, according to the present invention, with the same reference numerals depicted in FIG. 10 identifying similar parts or components. The device 310 of the third embodiment of the present invention includes a right housing 111 and a left housing 112, a right housing cover 113, a tension selector assembly 311, a pressure setting assembly 322, a rotator or hand crank 120, a shaft 121, a transmission element 122, a main cover 336, a spool 124, a cam 314, ball bearing 326, ball retainer 324, bearing mounting sleeve 320, and washer assembly 328.

Specifically, tension selector assembly 311 includes a pressure knob 115 or any of its equivalents in the art, preferably factory calibrated, and an adjustment knob shaft 312. The adjustment knob shaft 312 extends through an opening 316 in the left housing 112 and into the interior of the device 310. Cam 314 is rotatably mounted on the adjustment knob shaft 312 and the cam 314 is rotatable over a range of 180 degrees in response to the turning of the pressure knob 115. The range of pressures, for instance, may be denoted by angular markings over a 180 degree range on the left housing 112.Cam 314 is preferably a solid cylinder cut at an angle such that the rate of axial displacement vs. angular displacement is a known constant.

Adjacent to the cam 314 is spool 124 having front end 146 and rear end 149. Wound around the exterior of the spool 124 and extending outward from spool 124 at a 45 degree angle is cable 138, preferably a steel braided cable, as shown in FIG. 11 for attachment to a fisherman's line 42 in the same manner as described in the first two embodiments to set the drag on the line 42. Referring back to FIGS. 11 and 12, the front end 146 of the spool 124 is rotationally supported within spool bearing 318 which is located within bearing mounting sleeve 320 in order to hold the front end 146 of the spool 124 centered axially. In the interior of the spool 124 is pressure setting assembly 322, washer assembly 328, and a plurality of clutch balls 144, preferably spaced within a clutch ball capture disc 145 which is disposed flush with the rear end 149 of the spool 124.

The clutch balls 144 are mounted within the clutch ball capture disc 145 in such a manner that they are free to move axially (e.g. in the direction of the right housing 111 or left housing 112), but not radially. The clutch balls 144 are engagable by a plurality of transmission teeth 148 located on the outer periphery of a front end of the transmission element 122.

The transmission element 122 is mounted on shaft element 121a of shaft 121. Shaft 121, includes shaft element 121a and shaft element 121b (not shown) connected together by a needle bearing clutch 185 integral with shaft 121. Specifically, shaft element 121a extends from one end of needle bearing clutch 185 through an opening in transmission element 122 and into the interior of the spool 124 through bushing 174 in clutch ball capture disc 145 where shaft element 121a terminates adjacent to the clutch ball capture disc within the spool 124. On the other side of needle bearing clutch 185, shaft element 121b (not shown) extends through right housing 111 and is connected to the inner side wall 117 of the right housing cover 113.

The pressure setting assembly 322 located within the spool 124 includes ball retainer 324, ball bearing 326, and pressure spring 166. Ball bearing 326 is housed axially within ball retainer 324 which is contained within front end 146 of the spool 124. As shown in FIG. 11, the pressure spring 166 is disposed around front end 325 of ball retainer 324 and a segment of shaft element 121a, with the pressure spring 166 also in contacting relation to washer assembly 328. As explained below, compression of pressure spring 166 increases the force applied to the plurality of clutch balls 144 via the washer assembly 328. Washer assembly 328 includes both a pressure washer 170 and thrust roller bearing washer 175 mounted on shaft element 121a. Pressure washer 170 is adjacent to and in contacting relation with the pressure spring 166 and provides a uniform surface between the spring and thrust bearing washer. As for thrust bearing washer 175, it eliminates or reduces the friction between pressure washer 170 and the inside face of the clutch ball capture disc 145.

Ball bearing 326 is axially moveable forwards or backwards, depending upon the angle at which the pressure knob 115 is rotated. Cam 314, as mentioned above, is cut an angle such that the greater the angle of rotation of the pressure knob 115, the greater the amount of surface area of cam face 315 of cam 314 that will make contact with the ball bearing 326 thereby pushing the ball bearing 326 in an axially forward direction through opening in front end 325 of ball retainer 324 to urge against the pressure spring 166. In response, pressure spring 166 will compress and push the washer assembly 328 against the plurality of clutch balls 144 with a certain pressure causing the clutch balls 144 to move into further engagement with transmission teeth 148 of the transmission element 122. Therefore, the greater the angle of rotation selected on the pressure knob 115, the greater the amount of pressure that will be applied to the clutch balls 144.

Alternatively, if instead a decrease in the amount of pressure against the clutch balls 144 is desired, the angle of rotation of the pressure knob 115 may be decreased causing less and less of the surface area of the cam face 315 of cam 314 to come into contact with the ball bearing 326 causing ball bearing 326 to move axially backwards away from the pressure spring, thereby decompressing the pressure spring 166 and resulting in less pressure being applied to the plurality of clutch balls 144.

Transmission element 122 is rotatable about shaft element 121a by the turning of hand crank 120 clockwise to activate a gear mechanism 330. Specifically, gear mechanism 330, located between right housing 111 and right housing cover 113, includes a drive gear 212 which is mounted on a handle shaft 130 by way of a split clamp 211 and which is in mesh with pinion gear 210, which, in turn, is mounted on shaft element 121b (not shown) through opening 214 in pinion gear 210 in which opening 214 contains a shaft bearing 215 therein. Handle shaft 130 extends through the right housing cover 113 to the exterior of the device 310 where it passes through extension collar 332 and shaft collar 334 and is connected to crank arm 126 of handle crank 120. Extension collar 332 contains a bushing 333 which is housed partly within the extension collar 332 and partly within the right housing cover 113 and provides for smoother turning of the hand crank 120 without having to use a thick walled housing cover. Shaft collar 334 mounts handle crank 120 to extension collar 332.

When crank handle 129 is turned, drive gear 212 will rotate about the handle shaft causing a corresponding rotation of pinion gear 210. In turn, the rotation of the pinion gear 210 causes both shaft element 121b (not shown) and shaft element 121a, to rotate simultaneously if the handle crank 129 is rotated in the clockwise direction. When shaft element 121a rotates, transmission element 122 will also rotate and cause a corresponding rotation of the spool 122 when transmission teeth 148 of transmission element 122 are engaged with clutch balls 144. As the crank handle 129 is turned causing rotation of both the transmission element and spool simultaneously, eventually a point is reached when the force exerted by the fisherman's line 42 (shown in FIG. 2) on the spool exceeds the force exerted on the plurality of clutch balls 144 via washer assembly 328. At this point, the clutch balls 144 will slip out from engagement with the transmission teeth 148 of transmission element 122 allowing the transmission element 122 to rotate freely.

As already described in the second embodiment of the present invention depicted in FIG. 10, if crank handle 129 is instead rotated in the counterclockwise direction, only shaft element 121b (not shown) will be caused to rotate. Needle bearing clutch 185 will prevent the counterclockwise rotation of crank handle 129 from driving the rotation of shaft element 121a.

Referring again to FIGS. 11 and 12, a right thrust roller bearing 234 is also provided which eliminates or reduces friction between the outside face of the transmission element 122 and the right housing 111. Further, as shown in FIG. 11, a support sleeve 125 is also provided and is attached to inside wall 117 of the right housing 111 and mounted partially on rear end 149 of the spool 124 with part of the sleeve 125 extending beyond the rear end 149 of the spool 124 to cover transmission element 122 and right thrust roller bearing 234. The support sleeve 125 functions, as mentioned above for the second embodiment, as a lubrication enclosure and as a means of maintaining the transmission element 122 in contacting relation to the clutch ball capture disc 145. Disposed on support sleeve 125 is mount collar 335.

Finally, main cover sleeve 336 is connected to the right 113 and left housing 112 and covers the internal assembly of the device 310 and also provides a mounting surface for the mounting sleeve 320. Additionally, the main cover sleeve 336 contains a slot 338 in which cable 138 may pass through.

Figure 13:
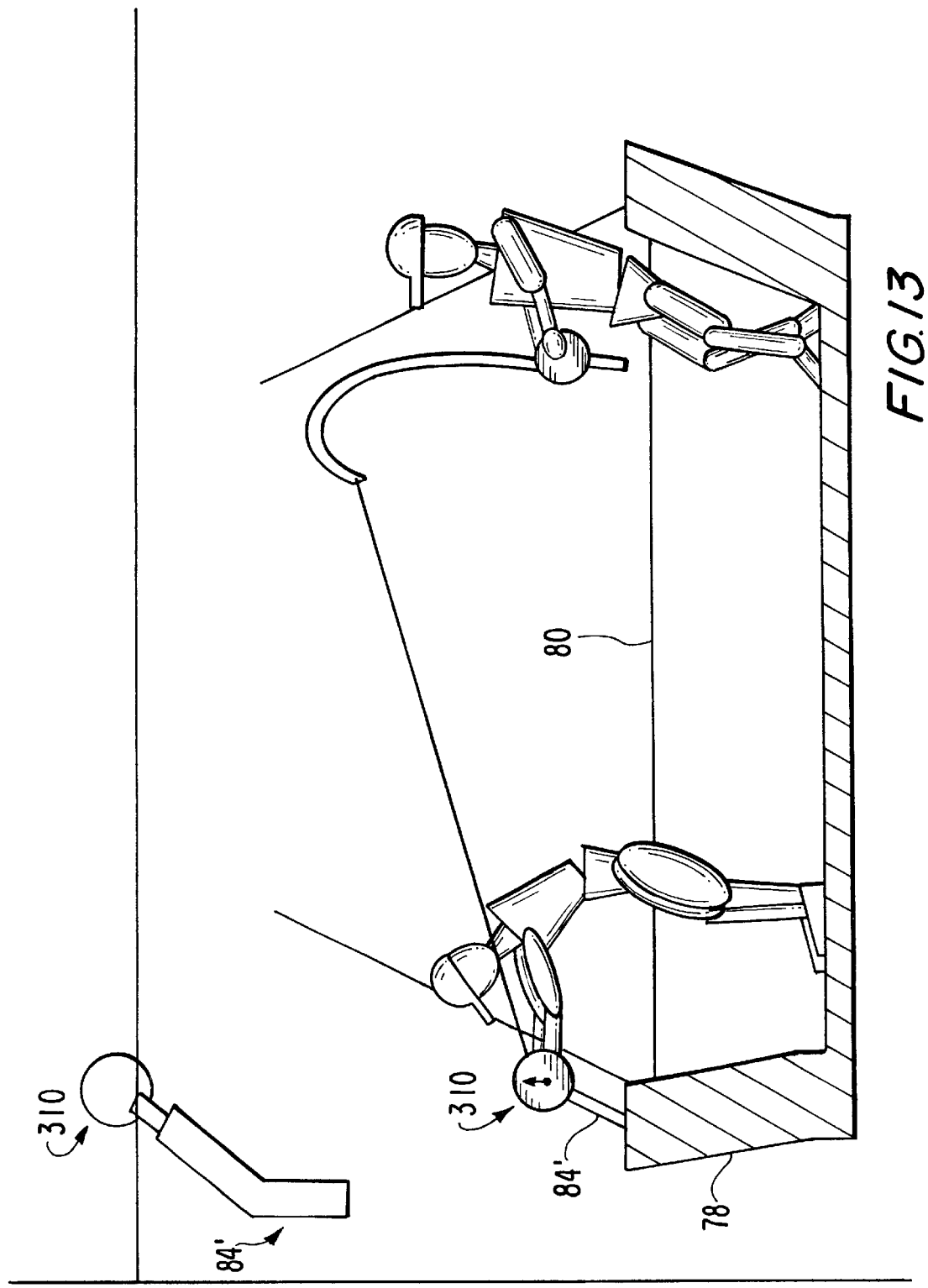
FIG. 13 is a rear cut-away view of the transom on a boat with a non-adjustable mount mounting the device in any of the three embodiments to the boat.

Mounting the device of the third embodiment to a gunnel of a boat or workbench may be accomplished in the same manner as described above for the first two embodiments and depicted in FIGS. 2, 3, 4, 5, and 6. Additionally, the device 310 of the third embodiment may also be mounted in the gunnel of a boat using a non-adjustable mount assembly 84' (25° angle), as shown in FIG. 13, or non-adjustable mount assembly 84" (straight angle) as shown in FIG. 14.

Figure 14:
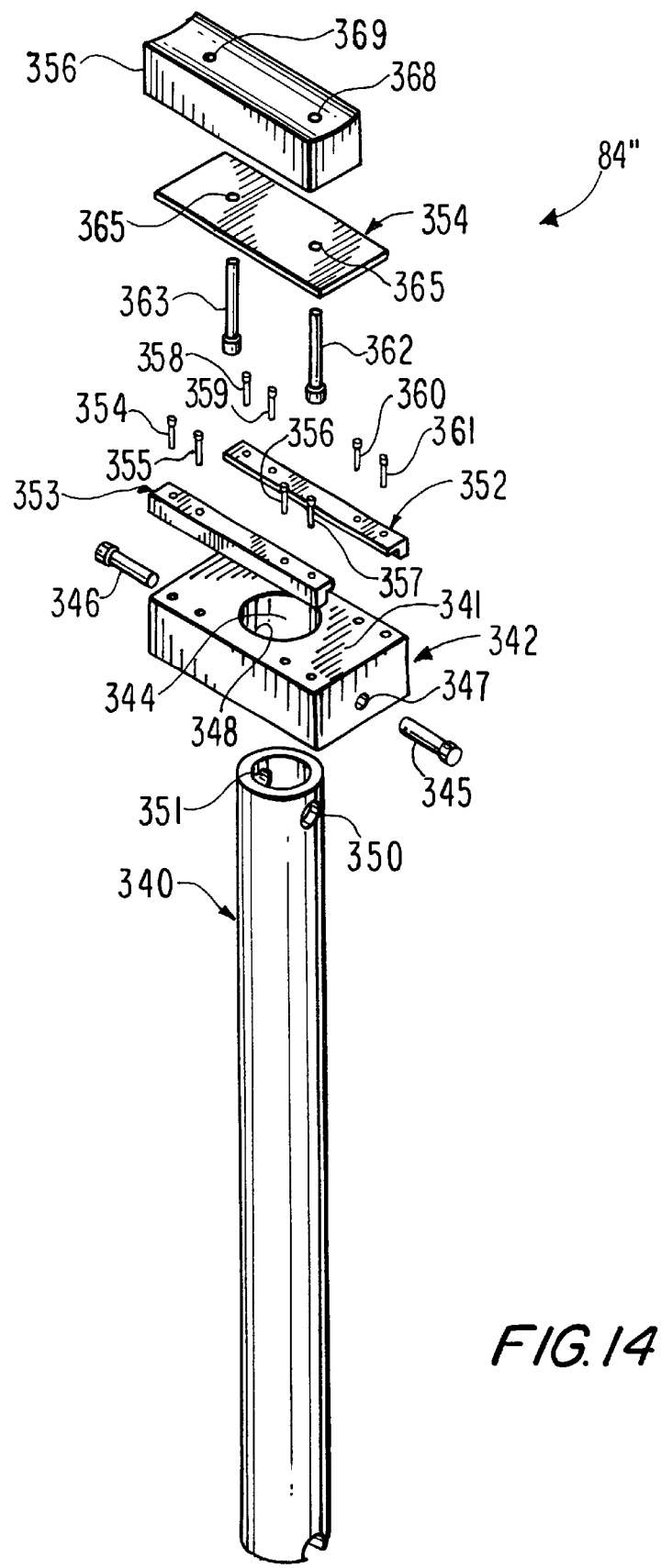
FIG. 14 is an exploded perspective view of a non-adjustable mount assembly.

Referring to FIG. 14, assembly 84" employs a stationary rod 340 in place of the telescopic rods and hinge used in the gunnel mount assembly 84 mentioned above so that assembly 84" has a fixed height and angle which is suitable for a typical gunnel 78 of a boat 80. Assembly 84" further includes a base 342 with an opening 344 for receiving stationary rod 340 therein and having preferably a pair of apertures 347, 348 on opposing sides of the base which correspond with a pair of apertures 350, 351 on opposing sides of stationary rod 340. Stationary rod 340 is fastened to base 342 of assembly 84' by a fastener such as screws 345, 346 which pass through apertures 347, 348 in base 342 and into apertures 350, 351 in stationary rod 340 to fasten the stationary rod 340 within the base 342 of assembly 84".

Assembly 84" also includes a pair of rails 352, 353, a plate 354, and a connecting piece 356. Rails 352, 353 are mounted to base 342 by a fastener such as screws 354, 355, 356, 357, 358, 359, 360, 361 which extend through holes in rails 352, 353 and into corresponding holes in top face 341 of base 342 to fasten rails 352, 353 to top face 341 of base 342 thereby forming a recess between base 342 and rails 352, 353. Plate 354 is connected to connecting piece 356 via a fastener such as screws 362, 363 which extend through holes 365, 366 in plate 354 into and through corresponding holes 368, 369 in connecting piece 356. Connecting piece 356 and plate 354 are locked into place by sliding plate 354 axially within the recess between rails 352, 353 and top face 341.

Referring back to FIGS. 11 and 13, device 310 is mounted to the gunnel 78 of the boat 80 by attaching connecting piece 356 and plate 354 of assembly 84" to device 310 via screws 362, 363 which extend through apertures 368, 369 in connecting piece 356 of assembly 84" and into corresponding openings 370, 371 in main cover sleeve 336, then axially sliding plate 354 into the recess between rails 352, 353 as described above, and then placing stationary rod 340 of assembly 84" within gunnel 78.

Alternatively, connecting piece 356 may also be used for mounting the device 310 on a workbench by simply mounting connecting piece 356 to the device 310 via openings 370, 371, without the plate 354. This allows for the attachment of connecting piece 356 to any type of bench vise for mounting device 310 to a workbench.

In addition, assemblies 84' and 84" may also be used for mounting the first two embodiments of the present invention to a gunnel of a boat or to a workbench. Moreover, a mounting assembly similar to components 342, 352–356 (with associated fasteners) can be employed with the mounting assemblies of FIGS. 2–6, and 13.

In use, the device of the third embodiment of the present invention is operated in generally the same manner as described above with regard to the first two embodiments.

The embodiments described above are not meant to be exclusive. Many other variations of the present invention would be obvious to those skilled in the art, and are contemplated to be within the scope of the appended claims.

What is claimed is:

1. A drag setting device, comprising:
   a fastening member for attaching to a fishing line of a fishing rod and reel;
   a pulling member for pulling the fishing line towards the drag setting device, the drag setting device being configured to apply a selected amount of tension to the fishing line;
   a first actuator for selecting an amount of tension to be applied by the drag setting device to the fishing line;
   a second actuator for causing the drag setting device to pull the fishing line towards the drag setting device to create in the fishing line the amount of tension selected with the first actuator.

2. The drag setting device according to claim 1, wherein the pulling member includes a spool in contacting relation to a transmission element, the spool being operably connected to the fastening member.

3. The drag setting device according to claim 2, wherein the pulling member further includes a hand crank, the hand crank being operable to rotate the transmission element, the transmission element being operable to rotate the spool until the amount of tension selected with the first actuator is applied to the fishing line.

4. The drag setting device according to claim 1, wherein the rotator is a hand crank.

5. The drag setting device according to claim 1, wherein the drag setting device is mounted in the gunnel of a boat upon a gunnel mount assembly comprising:
   an upper adjustable member;
   a lower adjustable member, said upper adjustable member and said lower adjustable member are each axially adjustable to different lengths depending upon a user's preference, said device is mounted upon the upper adjustable member, said lower adjustable member is housed within a gunnel of the boat;
   a pivotor connecting said upper adjustable member and said lower adjustable member, said pivotor is adjustable for selecting a desired angle for the gunnel mount assembly; and
   a locking mechanism for clamping the pivotor closed to secure the desired angle selected with the pivotor for the gunnel mount assembly.

6. The drag setting device according to claim 1, wherein the drag setting device is mounted on a workbench by a workbench assembly comprising:
   a bench clamp apparatus;
   a sleeve clamped to the workbench by said bench clamp apparatus;
   an upper adjustable member;
   a lower adjustable member, said upper adjustable member and said lower adjustable member may be adjusted axially to different lengths depending upon a user's preference, said drag setting device is mounted upon the upper adjustable member, said lower adjustable member is housed within the sleeve;
   a pivotor connecting said upper adjustable member and said lower adjustable member, said pivotor is adjustable for selecting a desired angle for the workbench assembly; and
   a locking mechanism for clamping the pivotor closed to secure the desired angle selected with the pivotor for the workbench assembly.

7. A drag setting device equipped with a cable that is attached to a line of a fishing rod to set a desired drag on the line by simulating a pulling action of a fish, comprising:
   a housing having a first side wall and a second side wall, said second side wall opposite said first side wall;
   a spool located within the housing having a front end and a rear end, said rear end of the spool located adjacent the second side wall;
   a shaft member extending through the second side wall into the housing of the device;
   a transmission element housed within the spool and mounted on the shaft member, said transmission element having an outer periphery of a front end engagable with an outer periphery of a front end of the spool;
   a rotator located outside of the housing adjacent to the second side wall, said rotator connected to the shaft member for rotating the transmission element about the shaft member causing a corresponding rotation of the spool when said outer periphery of said front end of said transmission element is engaged with the outer periphery of the front end of the spool;
   a tension adjuster housed partially within the first side wall; and
   a drag setting assembly located within the housing of the device between the first side wall and the front end of the spool, said tension adjuster causing the drag setting assembly to axially exert tension upon the outer periphery of the front end of the spool.

8. The drag setting device according to claim 7, wherein a plurality of spaced slip clutch balls are located on the outer periphery of the front end of the spool.

9. The drag setting device according to claim 8, wherein the transmission element has a plurality of spaced transmission teeth located on the outer periphery of the front end of the transmission element, said transmission teeth engagable with said plurality of slip clutch balls.

10. The drag setting device according to claim 9, wherein the drag assembly comprises:
    a pressure spring;
    a pressure spring plate in contacting relation with the pressure spring, said pressure spring plate is adjacent to the first side wall and urges against the pressure spring in response to contact from the tension adjuster; and
    a slip clutch plate in contacting relation with the pressure spring, said slip clutch plate adjacent to the plurality of slip clutch balls, said slip clutch plate being axially moveable against the plurality of slip clutch balls in response to axial movement of the tension adjuster, wherein axial movement of the slip clutch plate.

11. The drag setting device according to claim 7, wherein the tension adjuster is a pressure knob assembly comprising:
    a rear element located outside the housing adjacent the first side wall; and
    a front element housed within the first side wall and integral with the rear element, said front element movable axially forwards or backwards through the first side wall in response to manipulation of the rear element.

12. The drag setting device according to claim 11, wherein the rear portion of the tension adjuster is a factory calibrated ergonomic hand knob and said front element is a piston member integral with said ergonomic hand knob.

13. The drag setting device according to claim 11, wherein the rear portion of the tension adjuster is a lever and said front element is a piston member integral with said lever.

14. A mounting assembly comprising:
    an upper adjustable member;
    a lower adjustable member, said upper adjustable member and said lower adjustable member are each axially adjustable to different lengths depending upon a user's preference, said device is mounted upon the upper adjustable member, said lower adjustable member is housed within a gunnel of a boat;
    a pivotor connecting said upper adjustable member and said lower adjustable member, said pivotor is adjustable for selecting a desired angle for the mounting assembly; and
    a locking mechanism for clamping the pivotor closed to secure a desired angle.

15. A drag setting device equipped with a cable that is attached to a line of a fishing rod to set a desired drag on the line by simulating a pulling action of a fish, comprising:

a housing having a first side wall and a second side wall, said second side wall opposite the first side wall;

a spool located within the housing having a front end and a rear end, said rear end of the spool located adjacent the second side wall;

a plurality of spaced slip clutch balls located on an outer periphery of the front end of the spool;

a shaft extending through the second side wall into the housing of the drag setting device;

a transmission element housed within the spool and rotatably mounted on the shaft, said transmission element having a plurality of spaced transmission teeth on an outer periphery of a front end of the transmission element, said transmission teeth engageable with the plurality of slip clutch balls of the spool;

a rotator located outside of the housing adjacent the second side wall, said rotator connected to the shaft for turning the shaft to rotate the transmission element about the shaft, said transmission teeth transfer a radial force against the plurality of slip clutch balls as the transmission element rotates when the plurality of slip clutch balls are engaged with the transmission teeth;

at least one shaft bearing member mounted in the second side wall of the housing for supporting the turning of the shaft;

at least one spool bearing member mounted in the housing between the second side wall and a rear end of the spool for supporting the rotation of the spool, the spool rotates with the transmission element as the transmission element rotates when the plurality of slip clutch balls are engaged with the plurality of transmission element teeth;

a tension adjuster housed partially within the first side wall;

a pressure spring located within the housing of the drag setting device;

a pressure spring plate in contacting relation with the pressure spring; and a slip clutch plate in contacting relation with the pressure spring, said slip clutch plate adjacent to the plurality of slip clutch balls, said slip clutch plate being moveable against the plurality of slip clutch balls in response to an axial movement of the tension adjuster.

16. The drag setting device according to claim 15, wherein the tension adjuster is a pressure knob assembly comprising:

a rear element located outside of the housing and adjacent to the first side wall; and a front element housed within the first side wall and integral with the rear element, said front element movable axially forwards or backwards through the first side wall in response to manipulation of the rear end.

17. The drag setting device according to claim 16, wherein the rear element of the tension adjuster is a factory calibrated ergonomic hand knob and said front element is a piston member integral with said ergonomic hand knob.

18. The drag setting device according to claim 16, wherein the rear element of the tension adjuster is a lever and said front element is a piston member integral with said lever.

19. The drag setting device according to claim 15, wherein the rotator is a hand crank.

20. A method for setting a desired drag on a fishing reel comprising the steps of:

securing a drag setting device to a stationary member, the drag setting device including a fastening member, a pulling member, a first actuator, and a second actuator;

tying a fishing line of a fishing rod to the fastening member;

keeping the fishing rod substantially stationary;

manipulating the first actuator to select an amount of tension to be applied by the pulling member to the fishing line;

manipulating the second actuator to cause the pulling member to pull the fishing line towards the drag setting device until the selected amount of tension is applied to the fishing line;

manipulating a drag mechanism on the fishing rod and reel to release the fisherman's line slowly until the fisherman's line begins to drag outward.

21. A drag setting device equipped with a cable that is attached to a line of a fishing rod to set a desired drag on the line by simulating a pulling action of a fish, comprising:

a housing having a first side wall and a second side wall, said second side wall opposite said first side wall;

a spool located within the housing having a front end and a rear end, said rear end of the spool located adjacent the second side wall;

a shaft member extending through the second side wall into the housing of the drag setting device;

a transmission element housed within the spool and mounted on the shaft member, said transmission element having an outer periphery of a front end engagable with an inner periphery of the rear end of the spool;

a rotator located outside of the housing adjacent to the second side wall, said rotator connected to the shaft member for rotating the transmission element about the shaft member causing a corresponding rotation of the spool when said outer periphery of said front end of the transmission element is engaged with the inner periphery of the rear end of the spool;

a tension adjuster housed partially within the first side wall; and a drag setting assembly located within the housing of the drag setting device, said tension adjuster causing the drag assembly to axially exert tension upon the inner periphery of the rear end of the spool.

22. The drag setting device according to claim 21, wherein a plurality of spaced slip clutch balls are located on the inner periphery of the rear end of the spool.

23. The drag setting device according to claim 22, wherein the transmission element has a plurality of spaced transmission teeth located on the outer periphery of the front end of the transmission element, said transmission teeth engagable with said plurality of slip clutch balls.

* * * * *